(12) United States Patent
Hofer

(10) Patent No.: US 12,733,770 B2
(45) Date of Patent: Sep. 15, 2026

(54) GAS COOKING GRILL WITH LOWER BURNER

(71) Applicant: Crystal Spring Colony Farms Ltd., Ste. Agathe (CA)

(72) Inventor: Ethan Hofer, Ste. Agathe (CA)

(73) Assignee: Crystal Spring Colony Farms Ltd., Ste. Agathe (CA)

( * ) Notice: Subject to any disclaimer, the term of this patent is extended or adjusted under 35 U.S.C. 154(b) by 362 days.

(21) Appl. No.: 18/605,268

(22) Filed: Mar. 14, 2024

(65) Prior Publication Data

US 2025/0288153 A1 Sep. 18, 2025

(51) Int. Cl.
*A47J 37/07* (2006.01)
*A47J 37/06* (2006.01)

(52) U.S. Cl.
CPC ....... *A47J 37/0713* (2013.01); *A47J 37/0682* (2013.01)

(58) Field of Classification Search
CPC .......................... A47J 37/0682; A47J 37/0713
See application file for complete search history.

(56) References Cited

U.S. PATENT DOCUMENTS 5,038,747 A * 8/1991 Tsuchiya ............... F24C 15/205 126/21 R
8,490,614 B1 * 7/2013 Gregory .............. A47J 37/0754 126/41 R
2019/0133374 A1 * 5/2019 McAdams .......... A47J 37/0713
2021/0148578 A1 * 5/2021 Bellini ................ F24C 15/2042

* cited by examiner

*Primary Examiner* — Alfred Basichas
(74) *Attorney, Agent, or Firm* — Adrian D. Battison; Ryan W. Dupuis; Ade & Company Inc.

(57) ABSTRACT

A cooking grill includes a container defining a combustion volume underneath a cooking surface for receiving food materials to be cooked. A pair of first upper gas burners system are located to apply heat upwardly directly to the cooking surface. A second lower gas burner is located in the combustion volume at a height well below the cooking surface and below the height of the upper burners to introduce heat into the combustion volume rather than directly to the cooking surface. A wall extends generally over the lower burner at a height below the cooking surface to prevent direct application of heat from the second burner to the cooking surface. This forms a shelf of a drawer which can receive smoking material and can be slid forwardly for insertion of the material and removal of ash. The lower gas burner and is received in a chamber recessed from the bottom wall.

20 Claims, 6 Drawing Sheets

GAS COOKING GRILL WITH LOWER BURNER

This invention relates to a cooking grill for outdoor grilling and barbecuing of the type which uses a gas source for two or more gas burners to heat food products on a cooking surface.

BACKGROUND OF THE INVENTION

The conventional cooking grill of the type comprising a container mounted on legs and having an openable top lid for enclosing a cooking area has ben manufactured for many years and is available in many models from many manufacturers. A source of heat is provided within the cooking area for applying heat to food products to be cooked carried on a cooking surface typically a grate within the cooking area. Such grills are very widely used and are considered to provide gourmet level cooking processes. However there is always an intention to provide novel cooking grills of this general type which allow the user to obtain new and better cooking methods to provide a better resulting product.

For example in U.S. Pat. No. 9,814,354 is provided an arrangement in which a conventional gas grill is supplemented by an additional pellet grill located centrally between two gas burners. In this way heat can be applied to the cooking surface by a selected one or more of all three of the heat sources. The center heat source is thus a pellet grill and obtains its cooking heat from the burning of the pellets in a known manner.

SUMMARY OF THE INVENTION

According to a first aspect of the invention there is provided a cooking grill comprising:

a container defining a combustion volume;

a cooking surface over the combustion volume for receiving and supporting food materials to be cooked;

a first upper gas burner arranged in the container underneath the cooking surface at a height adjacent the cooking surface to apply heat from the first gas burner upwardly directly to the cooking surface;

and a second lower gas burner arranged in the combustion volume at a height below the cooking surface and below the first upper gas burner to introduce heat into the combustion volume;

wherein each of the first and second burners comprises a discharge nozzle with multiple gas discharge openings for generating cooking heat for the food materials;

the combustion volume being arranged such that the heat introduced by the second lower gas burner acts to apply heat to the combustion volume which heat in the combustion volume is applied to the food materials for cooking the food materials by surrounding the food materials on the cooking surface.

According to a second aspect of the invention there is provided a cooking grill comprising:

a container defining a combustion volume;

a cooking surface over the combustion volume for receiving and supporting food materials to be cooked;

a first upper gas burner arranged in the container underneath the cooking surface at a height adjacent the cooking surface to apply heat from the first gas burner upwardly directly to the cooking surface;

and a second lower gas burner arranged in the combustion volume at a height below the cooking surface and below the first upper gas burner to introduce heat into the combustion volume;

wherein each of the first and second burners comprises a discharge nozzle with multiple gas discharge openings for generating cooking heat for the food materials;

wherein the second lower gas burner includes a wall extending generally over the second lower gas burner at a height below the cooking surface to prevent direct application of the heat from the second lower gas burner to the cooking surface.

According to a third aspect of the invention there is provided a cooking grill comprising:

a container defining a combustion volume;

a cooking surface over the combustion volume for receiving and supporting food materials to be cooked;

a first upper gas burner arranged in the container underneath the cooking surface at a height adjacent the cooking surface to apply heat from the first gas burner upwardly directly to the cooking surface;

and a second lower gas burner arranged in the combustion volume at a height below the cooking surface and below the first upper gas burner to introduce heat into the combustion volume;

wherein there is provided a bottom wall of the combustion chamber underneath the first upper gas burner extending from one side of the first upper gas burner across toward the second lower gas burner;

wherein each of the first and second burners comprises a discharge nozzle with multiple gas discharge openings for generating cooking heat for the food materials;

and wherein the second lower gas burner is received in a chamber recessed from the bottom wall.

In general, as explained in more detail hereinafter, the heat applied is generated by a first burner closely adjacent the cooking surface which applies direct searing heat to the food on the cooking surface in a conventional manner and also is added a second lower burner which is retracted below the first burner well away from the cooking surface. The intention with this lower burner is that it acts to add heat into the cooking volume around the food so as to act as an oven around the food rather than a direct searing heat.

Each of the first and second burners comprises a discharge nozzle with multiple gas discharge openings for generating cooking heat for the food materials. That is the lower gas burner is of a type which itself is intended to generate the heat necessary to carry out the cooking action.

For this reason, preferably the combustion volume includes a cover or lid over the cooking surface so that the cooking volume is contained both above and below and thus heated throughout as an oven when the lower gas burner is used to generate the oven heat.

For this reason, preferably the second lower gas burner includes a wall or surface extending generally over the second lower gas burner at a height well below the cooking surface to prevent or reduce direct application of heat from the second lower gas burner to the cooking surface and thus better use the heat applied from the second burner into the oven system. Thus in many cases the upper searing burners can be turned off when the third burner is being used to generate the oven effect. However all burners can be used if maximum heat generation is required. The position of the lower burner is significantly different from the upper burner or burners so that the former applies heat into the whole volume while the latter is intended as a conventional searing heat for the products on the cooking surface. In this way a distance of more than 12 inches is desirable with the intervention of a surface or baffle which reduces the direct application of heat.

For this reason also there is provided a bottom wall of the combustion chamber underneath the first upper gas burner extending from one side of the first upper gas burner across toward the second lower gas burner and the second lower gas burner preferably is received in a chamber recessed from the bottom wall. The chamber is thus preferably narrower than the whole volume underneath the cooking surface.

Preferably the chamber is defined by upstanding walls, where one of the upstanding walls meets the bottom wall underneath the upper burner so as to direct any fluids downwardly to the bottom of the chamber for collection.

In some cases the first upper gas burner includes a single gas burner nozzle arrangement only on one side of the second lower gas burner. However more preferably the first upper gas burner includes a first and second gas burner nozzle arrangements each on a respective side of the second lower gas burner. The burner nozzles can be of a conventional construction using pipes with discharge holes along the pipe to increase an area over which the searing heat is applied.

The combustion volume is defined by the cooking surface at an upper face, two side walls depending from the cooking surface at respective sides thereof, front and rear surfaces depending from the cooking surface at respective front and rear thereof and a bottom surface spaced from the cooking surface. This provides a volume underneath the cooking surface which is closed above the surface by the conventional cover.

Preferably the bottom surface includes at least one inclined portion across the grill at one side underneath said first upper gas burner and a recessed portion below and connected to the inclined portion for receiving the second burner.

More preferably in a typical larger grill using dual burners at the cooking surface the bottom surface includes first and second inclined portions at respective sides underneath a first upper gas nozzle and a second upper gas nozzle with the central recessed portion for the third lower burner between and below the inclined portions.

In order to improve the available cooking effects preferably there is provided a support surface or pan above and covering the second lower gas burner and below the cooking surface on which smoke-producing material such as selected woods can be placed on the support surface for heating by the second lower gas burner. This produces a charring effect which can release flavoring smoke into the oven defined by the combustion volume.

As an alternative cooking process, the support surface or pan above the lower gas burner carries the combustible material thereon. In some cases the material is selected for generation of smoke and requires continued use oft the lower gas burner with the heat therefrom maintaining the combustion. In other cases the material can be selected so that it continues to burn after the heat from the lower burner is removed. Thus the construction defined can be used in many different cooking modes including the searing heat from the upper burners, the oven heat from the lower burner, maximum heat from all burners and a smoking action when all burners are turned off and the combustion material on the pan is allowed to burn slowly without external heat applied to generate smoke.

Preferably the support surface can be removed to extract the smoke-producing material or the remnants thereof from the combustion volume. For example, the support surface can form a drawer with a bottom shelf surface which can slide from the combustion volume for example through a front wall. Preferably the drawer has upstanding side walls and wherein the drawer is contained between two depending side walls of a bottom surface of the combustion volume and wherein the support surface has a series of holes to allow passage of heat from the second lower gas burner into the combustion volume where the holes are located between the drawer and the depending side walls. Preferably the support surface has a series of holes to allow passage of heat from the second lower gas burner into the combustion volume and to allow passage of melted fat downwardly into a bottom fat collection system.

BRIEF DESCRIPTION OF THE DRAWINGS

One embodiment of the invention will now be described in conjunction with the accompanying drawings in which:

FIG. 3 is a cut away view of the grill of FIG. 1 taken along line 3-3 in

FIG. 1.

In the drawings like characters of reference indicate corresponding parts in the different figures.

DETAILED DESCRIPTION

Figure 1:
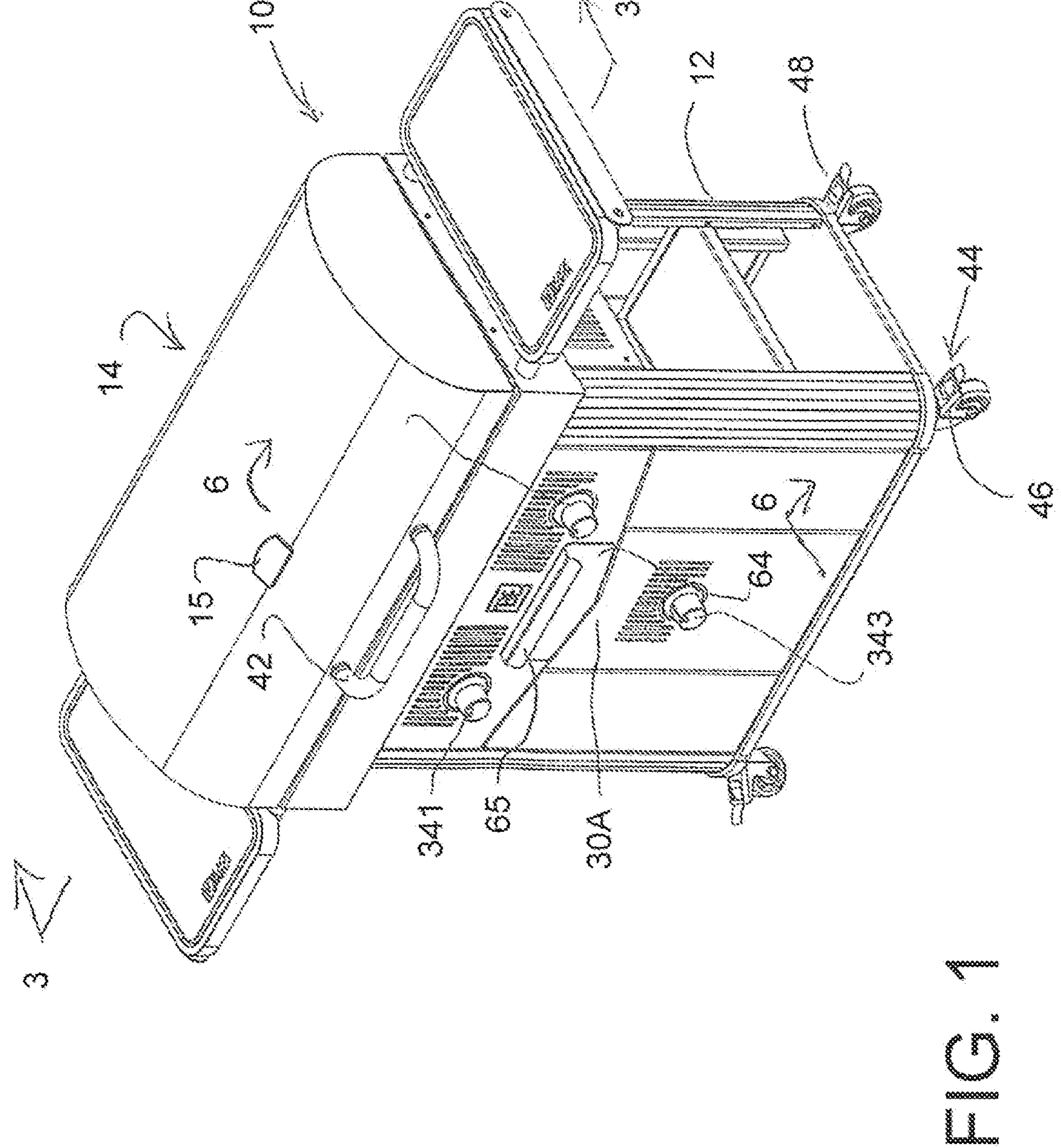
FIG. 1 is an isometric view of a grill according to the invention.
Figure 2:
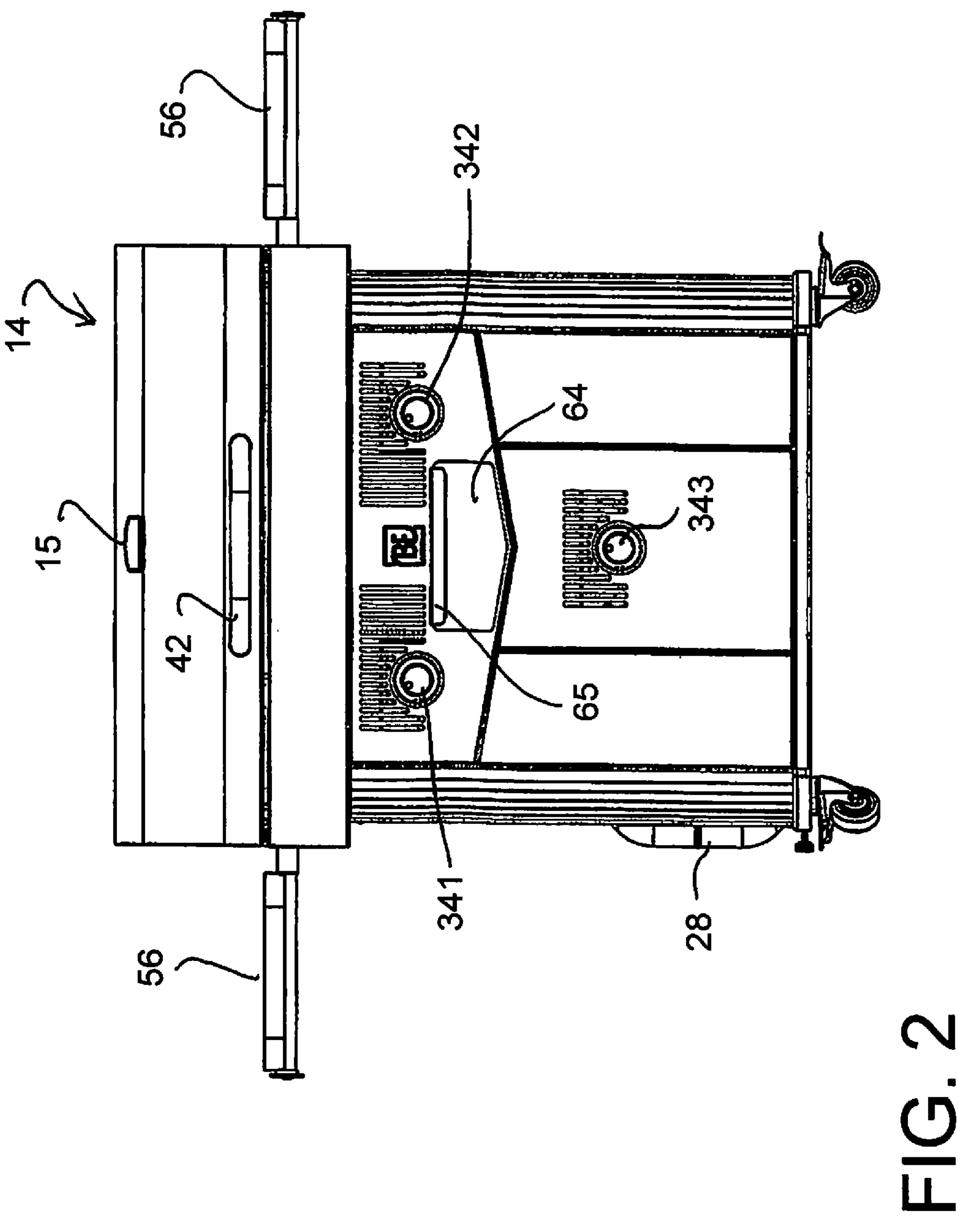
FIG. 2 is a front elevation view of the grill of FIG. 1.
Figure 3:
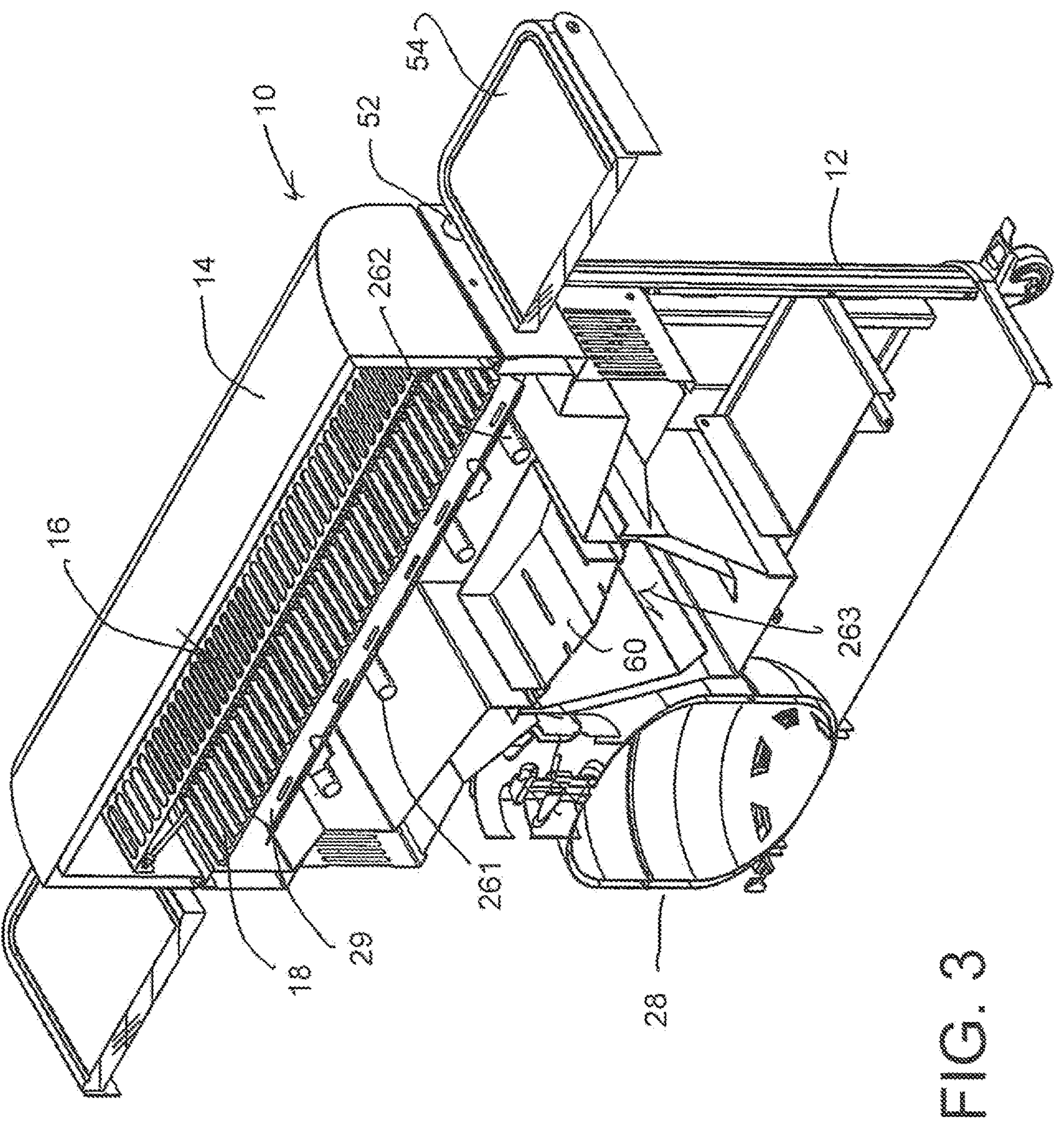

The cooking grill shown in the drawings includes a container 10 mounted on legs 12 and having an openable top lid 14 for enclosing an interior cooking area 16. A source of heat is provided within the cooking area for applying heat to food products to be cooked carried on a grate 18 within the cooking area. Also, a thermometer 15 is located in an upper portion of the lid 14 and is arranged to measure temperature in the cooking area 16 and display the temperature measured as a reference for a user while cooking. The source of heat comprises a gas burner 24 which is within the container and also beneath the grate. The gas burner includes two upper gas burner nozzles 261 disposed respectively on either side of a second lower gas burner. The burner nozzles are arranged to combust a supply of combustible gas, such as propane or natural gas, stored within a tank 28 so as to generate and apply heat to the cooking grate. An optional fire grate covering 29 can be disposed over the burner nozzles between the nozzles and the cooking grate as in a conventional grill for protecting the burner nozzles and pellet burner unit against grease dripping downwardly from food products received and supported on the cooking grate and onto the nozzles and burner unit. The fire grate covering is corrugated in shape in an upwardly direction towards the cooking grate along a full longitudinal length of the fire grate covering.

Turning now to the container 10 in more detail, the container has a peripheral wall 30 comprising front 30A and rear 30B covers and two opposing end walls 30C and 30D which close the peripheral wall at its two longitudinally opposing ends. Each end wall has a plurality of openings 301 therein located for permitting airflow through the container and for dissipating heat generated by the source of heat in the container. The end walls may be carried on respective internal hinges adjacent the rear cover 30B of the container so as to be openable for accessing an inside of the container. The front cover and front portions of the end walls collectively partially define a front wall of the container that also includes a fixed portion above the front cover. The fixed portion of the front wall carries gas control knobs 341 and 342 of the gas burner nozzles 261 and 262 projecting outwardly from the fixed portion of the front wall that are coupled to valves operatively connected between the nozzles and the tank. The gas control knobs are arranged to control the supply of gas to each burner for varying the amount of heat generated by the gas burner nozzles as in a conventional barbeque. The front cover carries a further control knob 343 at a second lower position for controlling the burner 263.

The cover or lid 14 forms a continuation of the wall 30 to cover an opening 38 between the front 30A and rear 30B covers and the end walls 300 and 30D. The lid is detachably carried on hinges 40 and is closed by a handle 42 so as to provide an attractive continuation of the container wall.

Each leg 12 of the grill is located at an internal corner of the cylindrical wall and coupled at a bottom of the container. Each leg comprises a wheel assembly having a wheel 44 supported for rotational movement on a mounting bracket 46. The mounting bracket is pivotal about an upright axis at the respective internal corner of the cylindrical wall so that the container is movable by rolling movement across a surface. The wheel assemblies have brakes 48 for resisting the rolling movement of the container such that the container remains stationary when the grill is in use.

The cooking grate 18 is horizontally oriented across the opening 38 of the container such that the grate is bridging the container at a height above the heat source and bridging a top edge of the opening 38 at the front and carried on a support ledge at the rear. As such, the cooking grate forms a conventional horizontal flat perforated grate for the food products. The top edge of the opening at the front and the support ledge at the rear are defined respectively by a tubular member 50 which is longitudinally oriented within the container. The two tubular members slidably receive a pair of struts 52 respectively in each collective longitudinal end of the tubular members. Each pair of struts is bridged at free ends of the struts by a decorative bridging element 54. Each pair of struts is slidably extendable from a retracted position in which a majority of the struts is received within the tubular members and the decorative bridging elements are substantially flush with outside ends of the cooking area 16 to an extended position in which the majority of the struts is extending outwardly beyond the container. A panel 56 defining a planar surface for supporting food products prior to or after cooking or cooking utensils thereon is arranged to be detachably supported on each pair of struts.

Figure 4:
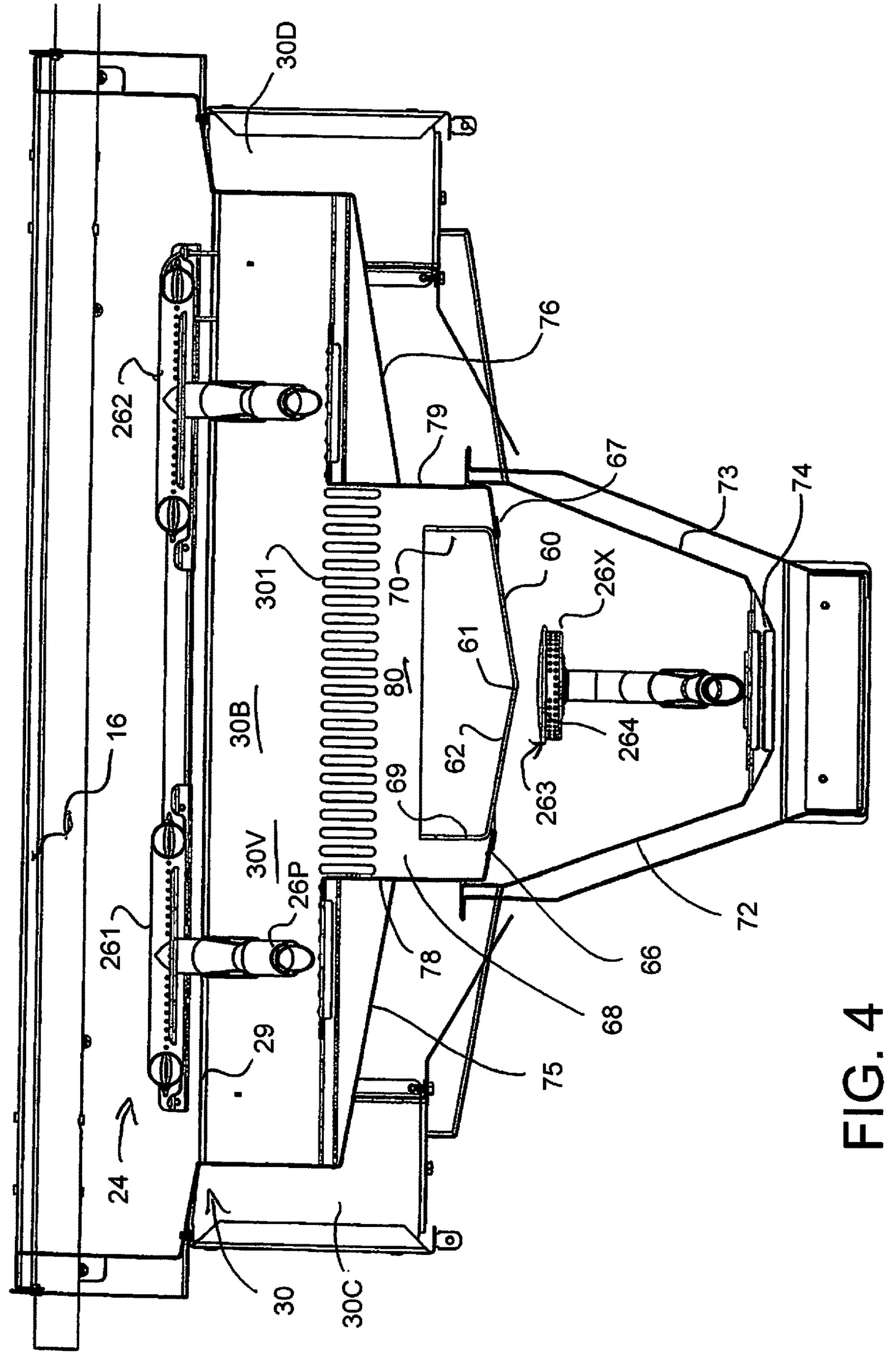
FIG. 4 is a cross-sectional view of the grill of FIG. 1 taken along line 3-3 in FIG. 1.

Turning now to the details of the gas burner nozzles of the cooking grill as best shown in the cross-section of FIG. 4, the grill includes the container 30 including the upstanding walls 30A, 30B, 30C and 30D defining sides of a combustion volume 30V. The cooking surface or grate 16 is located over the combustion volume for receiving and supporting food materials to be cooked. In FIG. 4, the cover or lid 14 is removed for clarity.

The first upper gas burner 261 and the second burner 262 are arranged in the container underneath the cooking surface at a height adjacent the cooking surface to apply heat from the first gas burner upwardly directly to the cooking surface. Between the cooking surface and the burner is provided the fire grate covering 29 so to spread the direct heat from the upper burners. The upper burners comprise an arrangement of pipes 26L and 26T longitudinal and transverse to the grill with discharge holes to feed the gas for combustion. The ends of the pipes 26L sit on a flange 26F along the rear wall of the container. The burners include a feed pipe 26P fed with gas from the control valves 341 and 342.

Figure 5:
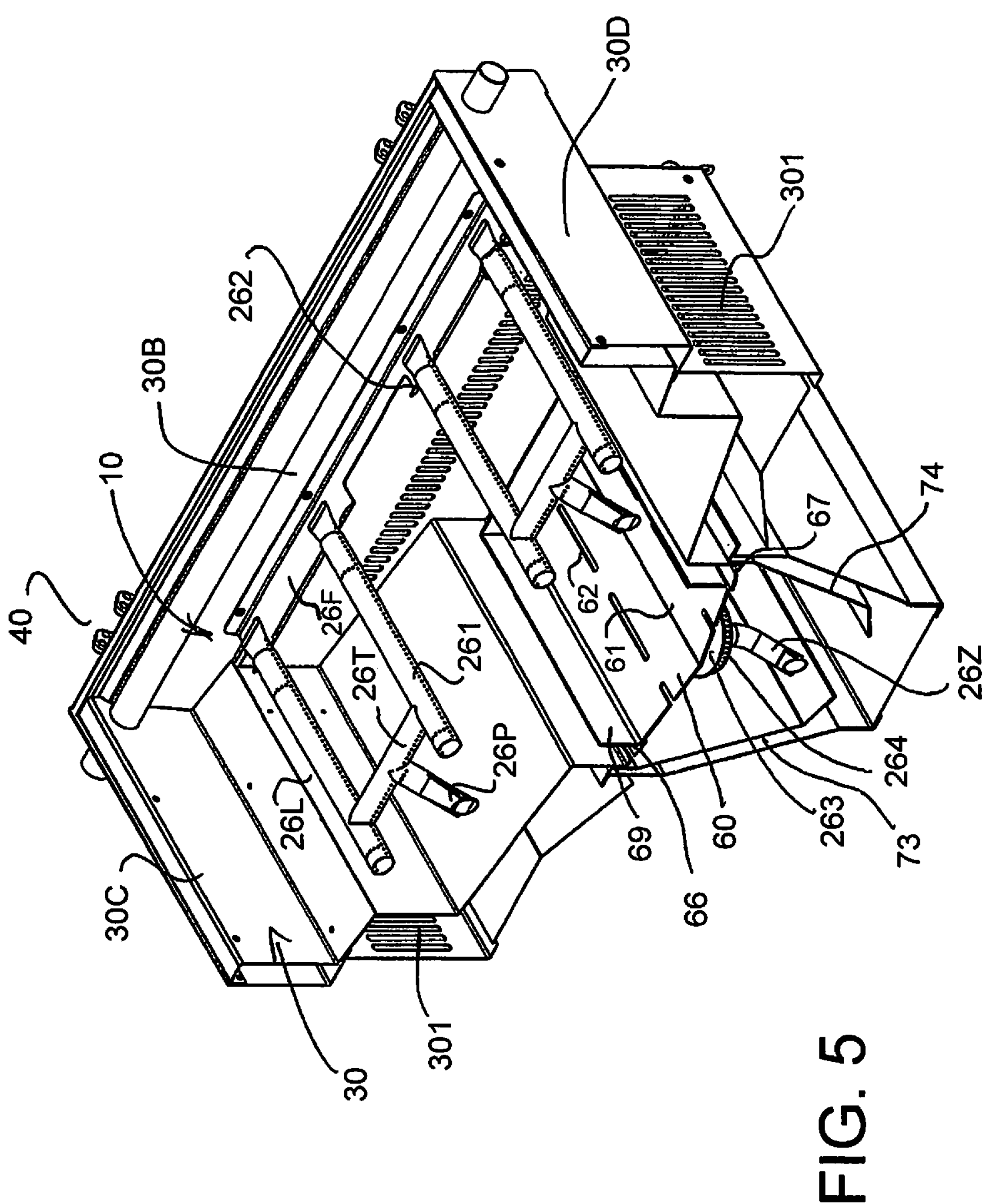
FIG. 5 is a cut away view of the grill of FIG. 1 taken along line 3-3 in FIG. 1 with some components removed for clarity.
Figure 6:
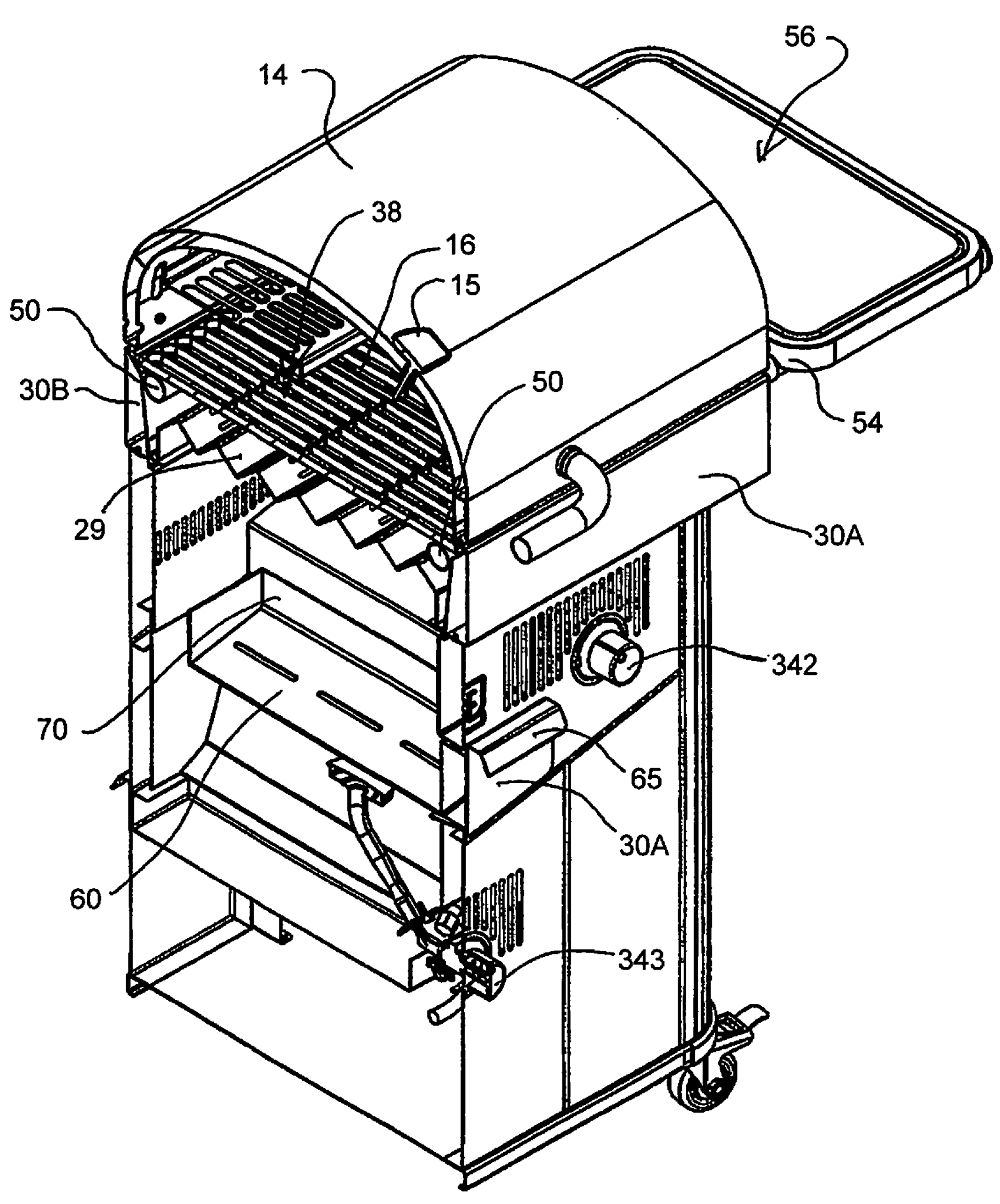
FIG. 6 is a cross-sectional view of the grill of FIG. 1 taken along line 6-6 in FIG. 1.

The second lower gas burner 263 is arranged in the combustion volume at a height below the cooking surface and below the first upper gas burner to introduce heat into the combustion volume. The lower system 263 as shown best in FIG. 4 or 5 includes a circular disk burner 26X with peripheral holes 26Y. this is designed to provide heat at a single location rather than to spread the heat widely across the cooking surface as in the upper burners because the lower burner is not intended to directly heat the cooking surface but instead to add heat in a general manner into the combustion volume. The burner connects though a pipe 26Z to the control valve 343 to supply gas at the required volume when required.

The combustion volume 30V is arranged such that the heat introduced by the second lower gas burner 26X acts to apply heat to the combustion volume which heat in the combustion volume is applied to the food materials by surrounding the food materials on the cooking surface rather than by the action of direct searing heat from the burner.

The second lower gas burner 263 and it burner 26X includes a wall or surface 60 extending generally over the burner 26X at a height below the cooking surface 16 to prevent or at least reduce direct application of heat from the burner 26X to the cooking surface 16. This wall 60 is generally V-shaped so as to converge to a bottom apex 61. The wall has slot shaped openings 62 longitudinal of the wall 60 so as to lie between the front and rear walls of the container. These allow heat and air to rise to fill the combustion volume and liquid to drip downwardly. The wall 60 forms the bottom wall or shelf of a drawer 63 which can slide forwardly toward the front face 30A of the container. The drawer 63 has a front face 64 lying in the plane of the front wall 30A and a handle 65 by which the user can grasp the drawer to pull it forwardly carrying material on the wall 62. In this way when the drawer is opened the user can place smoke generating materials on the shelf so that the heat from the burner 26X causes it to smoke for flavoring. Ashes can be extracted by removing the drawer for discharge.

The drawer 63 includes upstanding side walls 69 and 70 and sits on a pair of support flanges 66 and 67 on either side of the drawer. The drawer can be pulled forwardly for opening and is restrained from side-to-side movement by passage through a suitably shaped opening in the front face which confines the side walls and the base surface 60. The flanges 66 and 67 also have slot shaped openings along the flanges again to allow heat and air passage liquid to move downwardly. Any liquid moving downwardly falls onto inwardly inclined side walls 72 and 73 to converge to a collection pan 74.

The bottom wall of the combustion chamber 30V underneath the first upper gas burners 26 includes inclined walls 75 and 76 which extends from a respective one of the walls across toward the second lower gas burner 26X and includes vertical confining walls 78 and 79 which define a chamber 80 recessed from the bottom walls 75 and 76. Thus the chamber 80 is defined by upstanding walls 78 and 79, where the upstanding walls meet the bottom wall 75 and 76 to carry any falling liquid inwardly into the chamber for discharge to the bottom collection pan 74

The combustion volume 30B thus is defined by the cooking surface 16 at an upper face, two side walls 30C and 30D depending from the cooking surface at respective sides thereof, front and rear surfaces 30A and 30B depending from the cooking surface at respective front and rear thereof and a bottom surface spaced from the cooking surface where the bottom surface includes at least one inclined portion 75, 76 underneath the burners 261, 262 and a recessed portion 80 below and connected to the inclined portion 75, 76.

As the lower burner 263 is located in the recessed area 80, the heat produced thereby is used to heat the full volume of the combustion chamber for acting as an oven heating system rather than as a direct searing heat. The use of the support shelf 60 further separates the heat from the cooking surface and provides a support for smoking materials. Melted fat is directed over the inclined surfaces to the bottom pan for collection.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A cooking grill comprising:

a container defining a combustion volume;

a cooking surface over the combustion volume for receiving and supporting food materials to be cooked;

a first upper gas burner arranged in the container underneath the cooking surface at a height adjacent the cooking surface to apply heat from the first gas burner upwardly directly to the cooking surface;

and a second lower gas burner arranged in the combustion volume at a height below the cooking surface and below the first upper gas burner to introduce heat into the combustion volume;

wherein each of the first and second burners comprises a discharge nozzle with multiple gas discharge openings for generating cooking heat for the food materials;

the combustion volume being arranged such that the heat introduced by the second lower gas burner acts to apply heat to the combustion volume which heat in the combustion volume is applied to the food materials for cooking the food materials by surrounding the food materials on the cooking surface.

2. The cooking grill according to claim 1 wherein the combustion volume includes a cover over the cooking surface so that the combustion volume is heated throughout as an oven.

3. The cooking grill according to claim 1 wherein the second lower gas burner includes a wall extending generally over the second lower gas burner at a height below the cooking surface to prevent direct application of heat from the second lower gas burner to the cooking surface.

4. The cooking grill according to claim 1 wherein there is provided a bottom wall of the combustion chamber underneath the first upper gas burner extending from one side of the first upper gas burner across toward the second lower gas burner and wherein the second lower gas burner is received in a chamber recessed from the bottom wall.

5. The cooking grill according to claim 4 wherein the chamber is defined by upstanding walls, where one of the upstanding walls meets the bottom wall.

6. The cooking grill according to claim 1 wherein the first upper gas burner includes a gas burner nozzle on one side of the second lower gas burner.

7. The cooking grill according to claim 1 wherein the first upper gas burner includes a first and second gas burner nozzle each on a respective side of the second lower gas burner.

8. The cooking grill according to claim 1 wherein the combustion volume is defined by the cooking surface at an upper face, two side walls depending from the cooking surface at respective sides thereof, front and rear surfaces depending from the cooking surface at respective front and rear thereof and a bottom surface spaced from the cooking surface.

9. The cooking grill according to claim 8 wherein the bottom surface includes at least one inclined portion at one side underneath said first upper gas burner and a recessed portion below and connected to the inclined portion.

10. The cooking grill according to claim 8 wherein the bottom surface includes first and second inclined portions at respective sides underneath a first upper gas nozzle and a second upper gas nozzle and a central recessed portion below the inclined portion.

11. The cooking grill according to claim 1 wherein there is provided a support surface above and covering said second lower gas burner and below the cooking surface on which smoke-producing material can be placed on the support surface for heating by the said second lower gas burner.

12. The cooking grill according to claim 11 wherein the support surface can be removed to extract the smoke-producing material from the combustion volume.

13. The cooking grill according to claim 11 wherein the support surface comprises a drawer with a bottom shelf surface which can slide from the combustion volume to be removed to extract the smoke-producing material from the combustion volume.

14. The cooking grill according to claim 13 wherein the drawer can slide from the combustion volume through a front wall to be removed to extract the smoke-producing material from the combustion volume.

15. The cooking grill according to claim 14 wherein the drawer has upstanding side walls and wherein the drawer is contained between two depending side walls of a bottom surface of the combustion volume and wherein the support surface has a series of holes to allow passage of heat from the second lower gas burner into the combustion volume where the holes are located between the drawer and the depending side walls.

16. The cooking grill according to claim 11 wherein the support surface has a series of holes to allow passage of heat from the second lower gas burner into the combustion volume.

17. The cooking grill according to claim 16 wherein the holes allow passage of melted fat downwardly into a bottom fat collection system.

18. A cooking grill comprising:

a container defining a combustion volume;

a cooking surface over the combustion volume for receiving and supporting food materials to be cooked;

a first upper gas burner arranged in the container underneath the cooking surface at a height adjacent the cooking surface to apply heat from the first gas burner upwardly directly to the cooking surface;

and a second lower gas burner arranged in the combustion volume at a height below the cooking surface and below the first upper gas burner to introduce heat into the combustion volume;

wherein each of the first and second burners comprises a discharge nozzle with multiple gas discharge openings for generating cooking heat for the food materials;

wherein the second lower gas burner includes a wall extending generally over the second lower gas burner at a height below the cooking surface to prevent direct application of the heat from the second lower gas burner to the cooking surface.

19. The cooking grill according to claim 18 wherein there is provided a bottom wall of the combustion chamber underneath the first upper gas burner extending from one side of the first upper gas burner across toward the second lower gas burner and wherein the second lower gas burner is received in a chamber recessed from the bottom wall.

20. A cooking grill comprising:

a container defining a combustion volume;

a cooking surface over the combustion volume for receiving and supporting food materials to be cooked;

a first upper gas burner arranged in the container underneath the cooking surface at a height adjacent the cooking surface to apply heat from the first gas burner upwardly directly to the cooking surface;

and a second lower gas burner arranged in the combustion volume at a height below the cooking surface and below the first upper gas burner to introduce heat into the combustion volume;

wherein there is provided a bottom wall of the combustion chamber underneath the first upper gas burner extending from one side of the first upper gas burner across toward the second lower gas burner;

wherein each of the first and second burners comprises a discharge nozzle with multiple gas discharge openings for generating cooking heat for the food materials;

and wherein the second lower gas burner is received in a chamber recessed from the bottom wall.

* * * * *